000# United States Patent Office 2,805,258
Patented Sept. 3, 1957

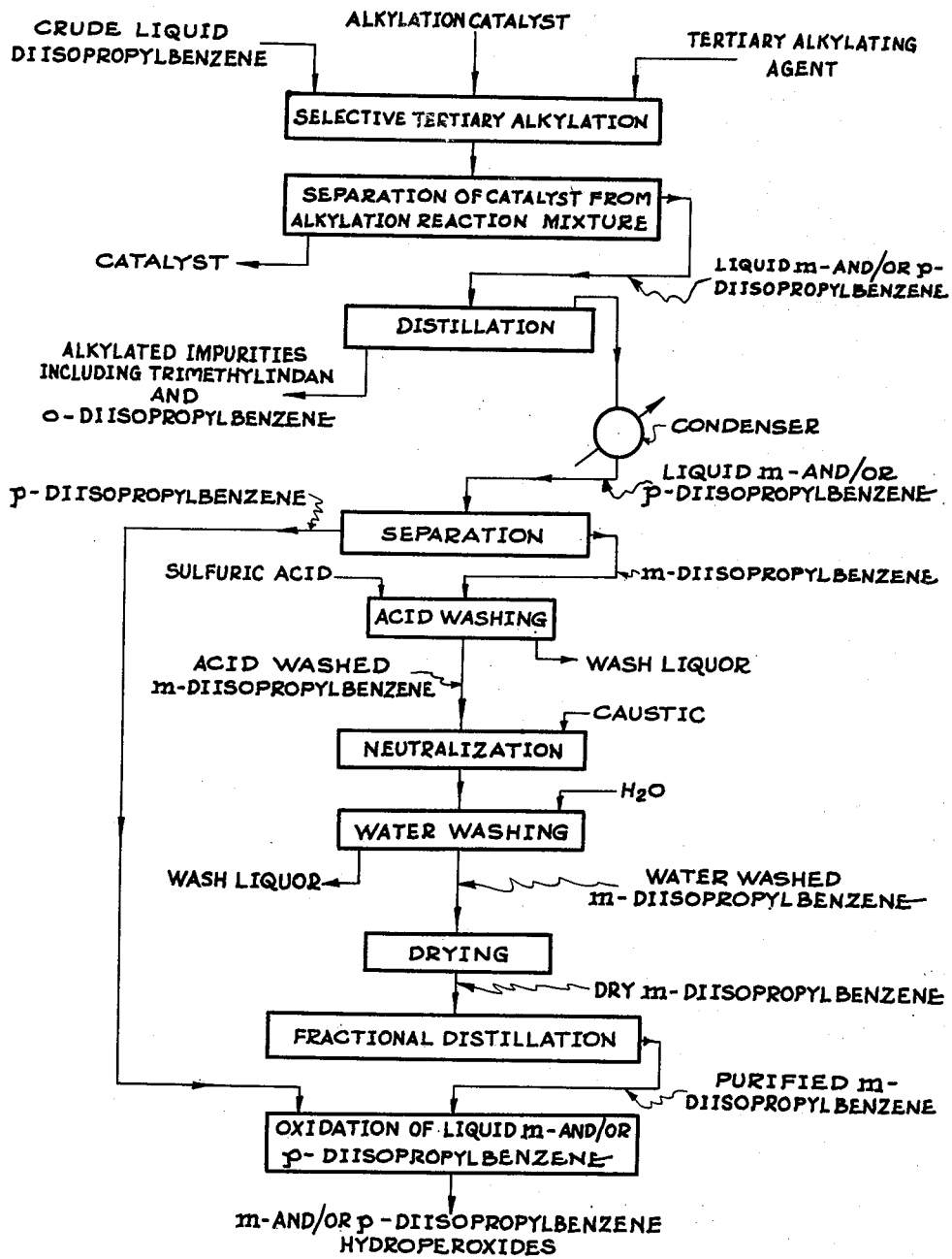

2,805,258

PROCESS FOR THE PREPARATION OF HYDROPEROXIDES FROM DIISOPROPYLBENZENES

Norman S. Boodman and Charles F. Fryling, Pittsburgh, Pa., assignors to Koppers Company, Inc., a corporation of Delaware Application May 23, 1955, Serial No. 510,523

7 Claims. (Cl. 260—610)

This invention relates in general to a process for preparing hydroperoxides from crude or commercial diisopropylbenzene. More specifically this invention is directed to a process for preparing hydroperoxides from crude or commercial isomeric diisopropylbenzene mixtures free of trimethylindan and also advantageously free of o-diisopropylbenzene.

Heretofore hydroperoxides of various hydrocarbons have been prepared by passing oxygen or an oxygen-containing gas through the hydrocarbon in liquid phase at elevated temperatures. It has been found that in the hydroperoxidation of crude or commercial diisopropylbenzene, certain impurities present in the diisopropylbenzene exhibit an inhibiting and retarding action tending to reduce the yield of hydroperoxides. It has been found that commercial diisopropylbenzene contains trimethylindan, possibly the 1,1,2- or the 1,1,3-trimethylindan or both, as a major impurity in the amount of approximately 5–10% and small amounts of isopropylbenzene and 2-phenyl-2,3-dimethylbutane. The term "trimethylindan" will be used herein to include one or more isomeric trimethylindans.

It has been found that trimethylindan in particular acts as an inhibitor in the hydroperoxidation of m- and p-diisopropylbenzenes to their corresponding mono- and di-hydroperoxides. Therefore it is necessary to remove the trimethylindan from diisopropylbenzene in order to get improved results in the production of hydroperoxides therefrom. Inasmuch as trimethylindan can be formed from o-diisopropylbenzene, it is also advantageous to remove the o-diisopropylbenzene prior to the hydroperoxidation of the m- and p-diisopropylbenzenes.

It has also been found that the presence of various styrene derivatives such as alpha-methyl styrene, isopropyl alpha-methyl styrene, etc., have an undesirable effect on the preparation of hydroperoxides.

It is therefore an object of this invention to provide an improved process for the preparation of hydroperoxides from diisopropylbenzene which will obviate these prior art difficulties.

Another object is to provide a process for preparing hydroperoxides from crude or commercial diisopropylbenzenes which will result in higher yields of hydroperoxides than would be normally expected.

Another object is to provide a process for preparing hydroperoxides from crude or commercial isomeric diisopropylbenzene mixtures wherein certain impurities including trimethylindan together with some or all of the o-diisopropylbenzene are removed from a mixture which also contains m- and p-diisopropylbenzene, and substantially pure m- and p-diisopropylbenzenes are recovered separately or in a mixture, and thereafter the m- and p-diisopropylbenzenes are oxidized to their corresponding hydroperoxides.

Additional objects will be apparent as the invention is hereinafter described in more detail.

It is to be understood that the terminology "impurities including trimethylindan" is used hereinafter to designate trimethylindan and accompanying impurities in crude diisopropylbenzene such as, for example, isopropylbenzene and 2-phenyl-2,3-dimethylbutane which are usually present in small amounts, and at least some of which are removable in the selective tertiary alkylate of trimethylindan as is hereinafter described.

It has now been found that improved yields of hydroperoxides are obtained by subjecting a member of the group consisting of m-, p-, and mixtures of m- and p-diisopropylbenzene in the liquid phase to treatment with oxygen at elevated temperatures, the trimethylindan, and advantageously other impurities such as o-diisopropylbenzene, having been removed from the group members prior to hydroperoxidizing. The oxidation can be accomplished by utilizing substantially pure oxygen gas or a gas containing oxygen, for example, air. The trimethylindan and o-diisopropylbenzene can be removed from the diisopropylbenzene containing the same by selectively tertiary-alkylating with a tertiary-alkylating agent in an amount sufficient to tertiary-alkylate the trimethylindan and at least some of the o-diisopropylbenzene in the presence of an alkylation catalyst, separating the raffinate as overhead from the tertiary-alkylate by distillation and separating the overhead or raffinate to recover m-diisopropylbenzene and p-diisopropylbenzene. The overhead or raffinate can be separated to recover m-diisopropylbenzene and p-diisopropylbenzene either by distillation or by selective alkylation of the meta isomer with isobutylene, etc., followed by subsequent distillation to separate the unalkylated para isomer from the alkylated meta isomer. Thereafter the alkylated meta-isomer can be dealkylated to regenerate m-diisopropylbenzene by subjecting the alkylate to dealkylating conditions, viz., temperatures of 300–400° C. in the presence of a cracking catalyst such as silica-alumina, silica-magnesia, fuller's earth, etc.

If desired, the separated m-diisopropylbenzene can be treated with a small amount of concentrated sulfuric acid, neutralized with caustic, washed with water, dried and distilled after the foregoing tertiary-alkylation treatment and prior to hydroperoxidation. It has been found that this further treatment with sulfuric acid increases the yield of hydroperoxide of the meta isomer by apparently removing additional impurities including alpha-methyl styrene, isopropyl alpha-methyl styrene, diisopropenylbenzene, etc. While the method of removing trimethylindan described herein is by alkylation, any other method of removing trimethylindan may be used within the scope of this invention.

The invention may be more thoroughly understood by reference to the accompanying drawings in which:

Fig. 2 is a flow sheet illustrating an additional embodiment of this invention.

Figure 1:
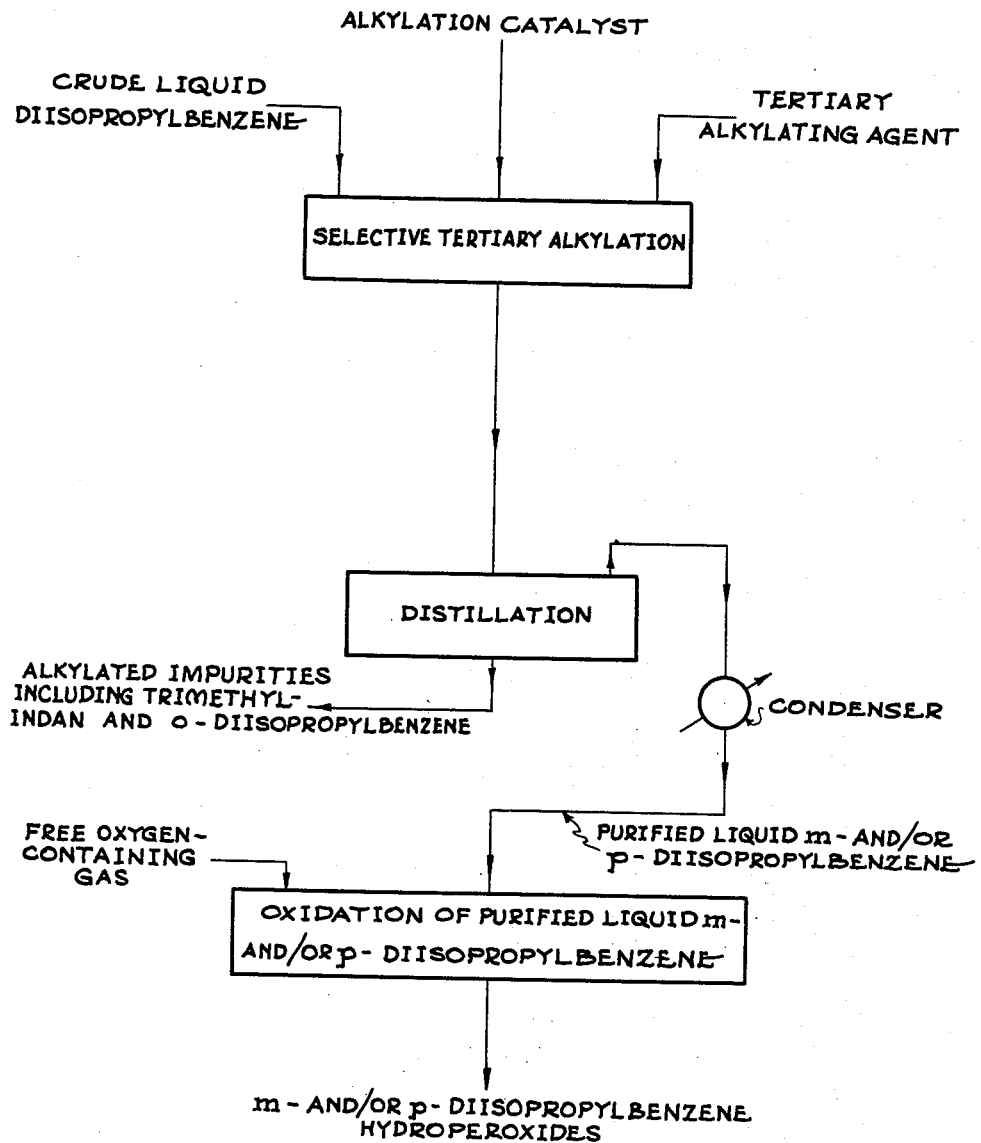
Fig. 1 is a flow sheet illustrating one embodiment of the invention.

More specifically, and in accordance with the procedure illustrated in Fig. 1, the crude or commercial diisopropylbenzene can be alkylated with a tertiary-alkylating agent so that impurities as discussed above or such impurities and o-diisopropylbenzene can be selectively tertiary alkylated to the substantial exclusion of the m- and p-diisopropylbenzenes. Thereafter the reaction mixture is distilled to separate a relatively low-boiling raffinate containing m- and p-diisopropylbenzene and a relatively high boiling fraction containing tertiary-alkylated impurities with or without tertiary-alkylated o-diisopropylbenzene, as desired. This low-boiling raffinate containing m- and p-diisopropylbenzene is then treated in the liquid phase with a free oxygen-containing gas such as molecular oxygen to form the corresponding hydroperoxides as is hereinafter described in more detail.

By tertiary-alkylating agent is meant an alkylating agent which has a reactive carbon atom attached to three other carbon atoms, such as t-butyl chloride, t-butanol, isobutylene, 2-chloro-2-methylbutane, 2-methylbutene-2, etc., including, in addition to halides, olefins and other alkylating agents in which the reactive carbon is doubly bonded or has halogen or hydroxy groups attached thereto, those compounds which sometimes under alkylating conditions react in a manner to give t-alkyl derivatives, such as 2-methylbutene-3,2-chloro-2-methylbutane, 2-methylpentene-3, etc.

In practicing the invention exemplified by the flow sheet of Fig. 2, crude isomeric diisopropylbenzenes containing the aforesaid impurities are subjected to tertiary-alkylation with a tertiary-alkylating agent, such as isobutylene; isoamylenes, such as 2-methylbutene-1, 2-methylbutene-2; isohexylenes, such as 2-methylpentene-1, 2-methylpentene-2, 3-methylpentene-2, and 2,3-dimethylbutene-2; tertiary octylenes, such as 2,2,4-trimethylpentene-4, 2,4-dimethylhexene-2, and 2,4-dimethylhexene-3; corresponding tertiary-alcohols, such as t-amyl alcohol, 2,4,4-trimethylpentanol-2, etc. and corresponding tertiary-alkyl halides, such as tertiary-butyl chlorides, tertiary-amyl chloride, 2-methyl-2-chloro-heptane, etc., or mixtures of any two or more thereof. Various well-known alkylation catalysts such as boron trifluoride, hydrogen fluoride, sulfuric acid, ferric chloride, various clay-type alkylation catalyts including the synthetic alumina-silica types, etc., may be used, but hydrogen fluoride, $H_2SO_4$, and ferric chloride alone or with hydrogen chloride are advantageous.

For efficient separation a ratio of about 1.2 moles or more of alkylating agent per mole of impurities or impurities plus o-diisopropylbenzene is desirable. While larger proportions of alkylating agent can often be used, there is generally no advantage in using more than 4 moles of alkylating agent per mole of impurities or impurities plus o-diisopropylbenzene, since with a greater excess of alkylating agent the yield of m- and p-diisopropylbenzene is reduced. Less than sufficient tertiary-alkylating agent to remove all of the o-diisopropylbenzene is used when the presence of some o-diisopropylbenzene is not objectionable. The optimum ratio will vary with the particular catalyst being used, generally in accordance with the competing tendency of the catalyst to promote polymerization by-products. For example, hydrogen fluoride, which has been found to give about the least amount of polymer by-product, can be used advantageously to give complete removal of the impurities aforesaid and the o-diisopropylbenzene as desired when used in the ratio of alkylating agent to impurities (and o-diisopropylbenzene, as desired) of at least about 1.2 to 1. With other catalysts which give more polymer by-products, such as sulfuric acid, a molar ratio of 2–4 to 1 is advantageous. A reaction temperature of −10 to 60° C. is advantageously used. It was surprising to find that with a single tertiary alkylation, such impurities as trimethylindan, isopropylbenzene, and 2-phenyl-2, 3-dimethylbutane, as well as the sometimes objectionable o-diisopropylbenzene can be selectively tertiary-alkylated by this method to give a relatively high boiling alkylate, which can be distillatively separated from a raffinate containing m- and p-diisopropylbenzene, thus permitting the facile and efficient separation of m- and p-diisopropylbenzene from a crude diisopropylbenzene. After this selective tertiary alkylation and prior to the distillation to separate this raffinate containing m- and p-diisopropylbenzenes from the higher boiling alkylate, the hydrocarbons of the alkylation reaction mixture are advantageously separated from the catalyst such as by decanting, or filtering when solid catalysts are employed. Before distillation it is also advantageous to neutralize these separated hydrocarbons such as by washing with water and then with an aqueous alkali solution. A mixture of m- and p-diisopropylbenzene is readily separated by distillation since their boiling points are about 7° C. apart.

The m-diisopropylbenzene which has been subjected to this previous tertiary alkylation treatment can be washed with a small amount of sulfuric acid, if desired, prior to hydroperoxidation to remove impurities not removed by the tertiary-alkylation treatment. This has been found to be advantageous in that it results in improved yields of hydroperoxides of m-diisopropylbenzene. The sulfuric acid is utilized in the washing operation in an amount ranging broadly from approximately 2–7% by weight and advantageously about 5% by weight based on the weight of the m-diisopropylbenzene. It is not desirable to use excessive amounts of sulfuric acid inasmuch as m-diisopropylbenzene is susceptible to sulfonation and the yield would be reduced. Although a single washing with sulfuric acid will result in improved yields of hydroperoxides of m-diisopropylbenzene, this washing is advantageously carried out approximately 4–6 times. Here again washing should not be repeated an excessive number of times inasmuch as the yield of m-diisopropylbenzene would be reduced. The m-diisopropylbenzene is then treated with caustic in an amount sufficient to neutralize the m-diisopropylbenzene and thereafter washed with water, advantageously about 5 times. However this water washing could be carried out considerably more than 5 times and less than 5 times, if desired. The acid derivatives of the hydrocarbon cannot be washed out with water alone until they have been neutralized with caustic. If desired, the m-diisopropylbenzene can then be dried, advantageously by being shaken with calcium chloride, although other means of drying could be employed such as steam distillation, shaking with calcium sulfate or phosphorus pentoxide, magnesium sulfate or sodium sulfate. However this drying operation can be omitted when the presence of some water is not objectionable. The m-diisopropylbenzene can then be distilled, if desired, at standard pressure or under reduced pressure to obtain a substantially pure fraction boiling at 201° to 203° C. at atmospheric pressure. It is to be understood that the foregoing sulfuric acid treatment is applied only to the m-diisopropylbenzene inasmuch as it improves the yield of hydroperoxides of this isomer only.

The m-diisopropylbenzene, p-diisopropylbenzene, or mixtures thereof can be subjected to treatment with oxygen at elevated temperatures either in a substantially pure liquid state or when emulsified in water with a small amount of emulsifying agent of the anionic type which is free of inhibiting substances. The temperature used for the oxidation can range from approximately 50 to 120° C., and advantageously from approximately 90 to 100° C. when the diisopropylbenzene is in a substantially pure liquid state. Temperatures ranging from approximately 75 to 100° C. and advantageously from about 80 to 90° C. can be employed for the oxidation when the diisopropylbenzene is emulsified in water.

The emulsification can be carried out at a water-diisopropylbenzene (either m-diisopropylbenzene, p-diisopropylbenzene, or mixtures thereof), volume ratio of at least about 2:1 and even slightly less. There is no upper limit to the amount of water that can be utilized in the emulsification and the diisopropylbenzene could be emulsified, if desired, in a large quantity of water. An anionic emulsifying agent, such as, for example, sodium oleate in the amount of 0.5% to about 2.0% by weight based on the weight of the diisopropylbenzene gives excellent results. However, as little as 0.2% by weight of anionic emulsifying agent and as much as 6% by weight and even higher can be utilized, if desired. Emulsification can be carried out with agitation, if desired.

The emulsifying agents utilized in the instant invention are of the anionic type and are free of inhibiting substances. Hydroperoxidation reactions have been found to be very susceptible to inhibition and the effect of inhibitors in decreasing the yield of the product is marked. Therefore emulsifying agents which contain high concentrations of inhibitors, for example linoleic, linolenic and abietic acids, etc., are not desirable for use in this invention.

Examples of anionic emulsifying agents which can be employed are the alkali metal salts of various alkyl-aryl sulfonic acids, such as, for example, sodium dodecylbenzene sulfonate, sodium alkyl naphthalene sulfonates, etc., as well as the alkali metal salts of higher fatty acids having from 12 to 18 carbon atoms, viz., the sodium or potassium salts of lauric, stearic, palmitic, myristic and oleic. Other surface active materials which can be utilized in this invention are materials marketed under the trademarks "Nacconol NRSF" (sodium alkyl-aryl sulfonate the surface active ingredient); "Antaron R–275" (sodium alkyl naphthalene sulfonate); "Dresinate 731" (sodium soap of disproportionated rosin acids); and the polymerized sodium salts of alkyl naphthalene sulfonic acids wherein the alkyl group is either a short or long carbon chain.

The following examples are provided as being illustrative of the instant invention but are not to be construed as limitations thereon. Various isomer contents are determined by infrared spectrometric analysis:

Example I

*Part A.*—Isobutylene (17.4 gram moles) is passed into a stirred, cooled (0–10° C.) mixture of 3240 grams (20 moles) of diisopropylbenenze (composition: 19 mole percent trimethylindan including a small amount of isopropylbenzene, 9 mole percent o-, 44 mole percent m- and 28 mole percent of p-diisopropylbenzene) and 325 grams (3.3 moles) of 96 percent sulfuric acid over a period of 8 hours. The hydrocarbon layer is separated, washed with water, refluxed with sufficient caustic to neutralize free acid and hydrolyze sulfonate, and distilled at 20 mm. Hg. in a 23 plate distillation column at a 5/1 reflux ratio. There is obtained a raffinate boiling at 92.5–127.5° C. at 20 mm. Hg pressure from which 100 percent of the trimethylindan and 85 percent of the o-diisopropylbenzene are removed. The yield is 69 percent based on crude feed. Under the above conditions the molar proportion of isobutylene to impurities plus o-diisopropylbenzene is 3.1:1. To remove all of the o-diisopropylbenzene, it is advantageous to increase the input of isobutylene, or to decrease the formation of isobutylene polymer by reducing the reaction temperature to, for example, −10° C., or by using anhydrous hydrogen fluoride as catalyst. With hydrogen fluoride as catalyst, the ratio of isobutylene to impurities plus o-diisopropylbenzene is reduced to approximately 1.2:1 to give similar advantageous results. The m- and p-diisopropylbenzene are separated by distillation at standard pressure or under reduced pressure.

The procedure is repeated using instead of isobutylene, 2-methylbutene-1, 2-methylpentene-1, and 2,2,4-trimethylpentene-3 as alkylating agents, and similar advantageous results are obtained.

*Part B.*—Concentrated sulfuric acid in the amount of 28 grams is then added to 257 grams of m-diisopropylbenzene which is ortho-free and free from impurities including trimethylindan, prepared in the foregoing manner. The mixture is shaken vigorously and then allowed to separate into 2 layers. The sulfuric acid layer is then separated from the hydrocarbon layer. This procedure is repeated 5 times. The m-diisopropylbenzene layer is washed with 500 ml. of 10% aqueous sodium hydroxide to neutralize the m-diisopropylbenzene. The m-diisopropylbenzene is then washed 5 times with water utilizing 150–200 ml. of water for each washing. The m-diisopropylbenzene is then dried by shaking with calcium chloride, and distilled at atmospheric pressure to obtain a m-diisopropylbenzene substantially free from impurities.

*Part C.*—The hydroperoxidation of m-diisopropylbenzene is performed using the following charge and the procedure described:

| | Parts by weight |
|---|---|
| m-Diisopropylbenzene, ortho-free and free from impurities including trimethylindan, and other impurities, prepared by the method of Part A | 174.3 |
| m-Diisopropylbenzene hydroperoxide, 100 percent basis [1] | 1.13 |
| Stearic acid | 1.75 |
| Water | 400 |
| Sodium hydroxide | 4.0 |
| Sodium pyrophosphate decahydrate | 7.0 |
| Temperature, °C | 83 |
| Time, hours | 96 |

[1] Initiator: 56 percent solution of technical m-diisopropylbenzene monohydroperoxide in m-diisopropylbenzene.

The diisopropylbenzene, in which the stearic acid is dissolved and to which the initiator solution is then added, is added with stirring to the aqueous solution containing the sodium pyrophosphate and sodium hydroxide to give an oil-in-water emulsion stabilized by in situ formation of sodium stearate. Oxygen is bubbled through the reaction medium for 96 hours at 83° C. with stirring at a rate sufficient to maintain saturation thereof. A yield of 139% by weight calculated as the monohydroperoxide is obtained. This figure broken down showed a yield of 44% by weight of m-diisopropylbenzene dihydroperoxide and 56% by weight of m-diisopropylbenzene monohydroperoxide, both yields being based on the purified m-diisopropylbenzene charged to the oxidation reactor to be oxidized.

With a m-diisopropylbenzene containing trimethylindan obtained from sulfuric acid-washed, alkali-neutralized and fractionally distilled diisopropylbenzene containing 19 mole percent impurities including trimethylindan, 9 mole percent o-, 44 mole percent m- and 28 mole percent p-diisopropylbenzene, 80% by weight of monohydroperoxide and only trace amounts of dihydroperoxide were obtained.

Example II

*Part A.*—Anhydrous ferric chloride in the amount of 48.6 grams is added by means of a dropping funnel to 486 g. (3 moles) of a cold (0–5° C.) diisopropylbenzene mixture (composition: 4 percent isopropylbenzene, 9 percent o-, 44 percent m-, 28 percent p-diisopropylbenzene, 15 percent trimethylindan) contained in a 2 liter flask equipped with a stirrer and thermometer. t-Butyl chloride in the amount of 386 g. (4 moles) is added to the stirred, cooled mixture over a period of two hours. The reaction mixture is then stirred at room temperature until the evolution of hydrogen chloride has ceased. The reaction mixture is poured onto ice and the hydrocarbon layer is separated. The hydrocarbon is washed with water and dilute caustic, dried and distilled to give 140 g. (0.86 mole) of raffinate boiling at 91°–126° C. at 20 mm. Hg pressure (composition: 1 mole percent isopropylbenzene, 1 mole percent o-, 59 mole percent m-, 39 mole percent p-diisopropylbenzene and 0 mole percent trimethylindan) and 291 g. of selective alkylate. The molar proportion of isobutylene to impurities plus o-diisopropylbenzene is 2.1:1. By increasing the addition of t-butyl chloride or reducing the reaction temperature to, for example, −10° C., a raffinate is obtained free of all impurities and of o-diisopropylbenzene.

This procedure is repeated using instead of t-butyl chloride, 2-chloro-2-methylbutane, 3-chloro-3-methylpentane, 3-chloro-2-methylhexane, and 2-chloro-2,4,4-trimethylpentane, and similar advantageous results are obtained.

*Part B.*—m-Diisopropylbenzene in the amount of 188 grams, which is rendered ortho-free and free from impurities including trimethylindan in accordance with the procedure of part A, is washed with 23 grams of concentrated sulfuric acid following substantially the procedure of Example I, part B. However in this example, the washing with concentrated sulfuric acid is repeated 3 times, the m-diisopropylbenzene layer is washed with 475 ml. of 10% aqueous sodium hydroxide, and the m-diisopropylbenzene is thereafter washed 4 times with water utilizing 100–150 ml. of water for each washing.

m-Diisopropylbenzene in the amount of 173.1 parts by weight, which is first treated in accordance with the procedure of part A only is oxidized following the procedure of part C which is hereinafter set forth. A substantially identical amount of m-diisopropylbenzene, which is treated following the procedure of both part A and part B, is also oxidized in accordance with the procedure of part C.

*Part C.*—The following formulation was oxidized in accordance with the procedure of Example I, part C:

| | Parts by weight |
|---|---|
| m-Diisopropylbenzene, ortho free and free from impurities, including trimethylindan, prepared in accordance with the procedure of part A | 173.1 |
| m-Diisopropylbenzene hydroperoxide | 2.0 |
| Stearic acid | 1.75 |
| Water | 400 |
| Sodium hydroxide | 4.0 |
| Sodium pyrophosphate decahydrate | 7.0 |

A yield of 104% by weight calculated as the monohydroperoxide was obtained in 71 hours when the m-diisopropylbenzene had been treated following the procedure of part A only. This figure when broken down showed a yield of 6% m-diisopropylbenzene dihydroperoxide and 90% m-diisopropylbenzene monohydroperoxide, both yields being based on the purer m-diisopropylbenzene charged to the oxidation reactor to be oxidized.

A yield of 114% by weight calculated as the monohydroperoxide and based on the purer m-diisopropylbenzene charged to the oxidation reaction is obtained in only 31 hours when the m-diisopropylbenzene had been treated in accordance with both part A and part B of this example.

*Example III*

To 85.13 grams of m-diisopropylbenzene, which is first treated following the procedure of Example I, part A, is added 1.0 ml. of m-diisopropylbenzene hydroperoxide initiator. To this mixture is added 0.38 gram of anhydrous sodium carbonate catalyst. Oxygen is bubbled through the reaction medium for 15 hours at a temperature of 110° C. A yield of 81% by weight m-diisopropylbenzene monohydroperoxide, based on the weight of the purer m-diisopropylbenzene charged to the oxidation reactor to be oxidized, is obtained.

Similar advantageous results are obtained when a potassium carbonate, lithium hydroxide, potassium hydroxide, or sodium hydroxide catalyst is utilized in place of the sodium carbonate.

*Example IV*

The m-diisopropylbenzene of Example III minus the catalyst, which is first treated following the procedure of Example II, part A, is oxidized in accordance with the procedure of Example III at a temperature of 93° C. A yield of 51.8% by weight m-diisopropylbenzene monohydroperoxide based on the purer m-diisopropylbenzene charged to the oxidation reactor is obtained in 18 hours.

When the m-diisopropylbenzene is also subjected to the sulfuric acid treatment of Example II, part B, prior to oxidation a yield of 74% by weight m-diisopropylbenzene monohydroperoxide is obtained in 13 hours.

*Example V*

The formulation of Example II, part C, which contains m-diisopropylbenzene which is first treated in accordance with the procedure of part A of this example is oxidized in accordance with the procedure in Example I, part C. A yield of 101% by weight calculated as the monohydroperoxide is obtained in 50.5 hours.

When the m-diisopropylbenzene of this formulation is also subjected to the sulfuric acid treatment following the procedure of Example II, part B prior to oxidation, a yield of 118% by weight calculated as m-diisopropylbenzene monohydroperoxide is obtained in 45 hours.

Similar advantageous yields are obtained when the m-diisopropylbenzene is emulsified in water in the presence of a small amount of sodium dodecylbenzene sulfonate, "Nacconol NRSF," sodium salt of di-octyl sulfosuccinate, and sodium and potassium soaps of disproportionated rosin acids.

*Example VI*

The following formulation is oxidized in accordance with the procedure of Example I, part C:

| | Parts by weight |
|---|---|
| p-Diisopropylbenzene, ortho free and free from impurities including trimethylindan, prepared by the method of Example I, Part A | 172.9 |
| m-Diisopropylbenzene hydroperoxide | 2 |
| Stearic acid | 1.75 |
| Water | 400 |
| NaOH | 4 |
| Sodium pyrophosphate decahydrate | 7.0 |

A yield of 126% by weight calculated as p-diisopropylbenzene monohydroperoxide is obtained in 57.5 hours. Broken down this figure shows a yield of 43% of p-diisopropylbenzene monohydroperoxide and 41% of p-diisopropylbenzene dihydroperoxide, both yields being based on the purer p-diisopropylbenzene charged to the oxidation reactor.

*Example VII*

To 80.5 grams of p-diisopropylbenzene, which is first treated in accordance with the procedure of Example II, part A, is added 1 ml. of m-diisopropylbenzene monohydroperoxide. Oxygen is bubbled through the reaction medium for 18 hours and a yield of 56% by weight p-diisopropylbenzene monohydroperoxide based on the purer p-diisopropylbenzene charged to the oxidation reactor is obtained.

*Example VIII*

A mixture of approximately equal parts by weight of m- and p-diisopropylbenzene, which is first treated following the procedure of Example II, part A, is hydroperoxidized following the procedure of Example VII. A yield of about 35% p-diisopropylbenzene dihydroperoxide is obtained in 21 hours.

In the foregoing examples, by recycling and further hydroperoxidation of the monohydroperoxide of p-diisopropylbenzene and unreacted p-diisopropylbenzene remaining in the reaction mixture, the overall yield of p-diisopropylbenzene dihydroperoxide can be considerably increased.

The yield percentages of hydroperoxide reported herein are calculated as monohydroperoxide. A theoretical maximum yield of 172% represents a complete conversion to dihydroperoxide.

This treatment can also be utilized to remove impurities of the type described herein for a composition containing only m- or p-diisopropylbenzene or a mixture of any two diisopropylbenzene isomers prior to hydroperoxidizing. Likewise compositions containing only the m-isomer or the p-isomer or a mixture of only the o- and p-isomers give similar advantageous results upon such treatment.

The invention claimed is:

1. A process for the production of a diisopropylbenzene hydroperoxide-containing reaction mixture which comprises subjecting a member selected from the group consisting of m-diisopropylbenzene, p-diisopropylbenzene and mixtures of m- and p-diisopropylbenzene containing impurities including trimethylindan and o-diisopropylbenzene in liquid phase to alkylating conditions in contact with an alkylation catalyst and an alkylating agent having at least one tertiary carbon atom per molecule, the molar ratio of said alkylating agent to said impurities including trimethylindan and o-diisopropylbenzene being from about 1.2–4 to 1, to alklate said impurities including trimethylindan and o-diisopropylbenzene while said selected member of the group consisting of m-diisopropylbenzene, p-diisopropylbenzene and mixtures of m- and p-diisopropylbenzene remains substantially unalkylated, distilling the reaction mixture to distill the substantially unalkylated member therefrom and leave the aforesaid alkylated impurities in the residue, and thereafter treating the aforesaid distilled unalkylated member in liquid phase wth a free oxygen-containing gas at a temperature of from about 50° C. to about 120° C.

2. A process for the production of a diisopropylbenzene hydroperoxide-containing reaction mixture, which comprises subjecting a mixture of m-diisopropylbenzene, p-diisopropylbenzene and mixtures of m- and p-diisopropylbenzene containing impurities including trimethylindan and o-diisopropylbenzene in liquid phase to alkylating conditions in contact with an alkylation catalyst and an alkylating agent having at least one teritary carbon atom per molecule, the molar ratio of said alkylating agent to said impurities including trimethylindan and o-diisopropylbenzene being from about 1.2–4 to 1, to alkylate said impurities including trimethylindan and o-diisopropylbenzene while said selected member of the group consisting of m-diisopropylbenzene, p-diisopropylbenzene and mixtures of m- and p-diisopropylbenzene remains substantially unalkylated, distilling the reaction mixture to distill the substantially unalkylated member therefrom and leave the aforesaid alkylated impurities in the residue, and thereafter treating the aforesaid distilled unalkylated member in liquid phase with a free oxygen-containing gas at a temperature of from about 75° C. to about 100° C.

3. A process for the production of a diisopropylbenzene hydroperoxide-containing reaction mixture, which comprises subjecting a mixture of m- and p-diisopropylbenzene containing impurities including trimethylindan and o-diisopropylbenzene in liquid phase to alkylating conditions in contact with an alkylation catalyst and an alkylating agent having at least 1 tertiary carbon atom per molecule, the molar ratio of said alkylating agent to said impurities including trimethylindan and o-diisopropylbenzene being from about 1.2–4 to 1, to alkylate said impurities including trimethylindan and o-diisopropylbenzene while the m- and p-diisopropylbenzene remain substantially unalkylated, distilling the reaction mixture to distill the substantially unalklated m- and p-diisopropylbenzene therefrom and leave the alkylated impurities in the residue, separating the distilled mixture of m- and p-diisopropylbenzene to separately recover m- and p-diisopropylbenzene, washing the separated m-diisopropylbenzene with from about 2% to about 7% by weight of sulfuric acid based on the weight of the m-diisopropylbenzene to further remove impurities therefrom, neutralizing the thus-washed m-diisopropylbenzene to make possible the subsequent removal of sulfuric acid derivatives of m-diisopropylbenzene from the m-diisopropylbenzene by washing with water then washing said m-diisopropylbenzene with water to remove sulfuric acid derivatives of m-diisopropylbenzene therefrom, and thereafter treating the m-diisopropylbenzene from the last-mentioned step in liquid phase with a free oxygen-containing gas at a temperature of from about 50° C. to about 120° C.

4. A process for the production of a diisopropylbenzene hydroperoxide-containing reaction mixture, which comprises subjecting a mixture of m- and p-diisopropylbenzene containing impurities including trimethylindan and o-diisopropylbenzene in liquid phase to alkylating conditions in contact with an alkylation catalyst and an alkylating agent having at least 1 tertiary carbon atom per molecule, the molar ratio of said alkylating agent to impurities including trimethylindan and o-diisopropylbenzene being from about 1.2–4 to 1, to alkylate said impurities including trimethylindan and o-diisopropylbenzene while the m- and p-diisopropylbenzene remain substantially unalkylated, distilling the reaction mixture to distill the substantially unalkylated m- and p-diisopropylbenzene therefrom and leave the alkylated impurities in the residue, separating the distilled mixture of m- and p-diisopropylbenzene to separately recover m- and p-diisopropylbenzene, washing the separated m-diisopropylbenzene with from about 2% to about 7% by weight of sulfuric acid based on the weight of the m-diisopropylbenzene to further remove imparities therefrom, neutralizing the thus-washed m-diisopropylbenzene to make possible the subsequent removal of sulfuric acid derivatives of m-diisopropylbenzene from the m-diisopropylbenzene by washing with water, then washing this neutralized m-diisopropylbenzene with water to remove sulfuric acid derivatives of m-diisopropylbenzene therefrom, drying the wet water washed m-diisopropylbenzene, then fractionally distilling the dry m-diisopropylbenzene to recover a substantially pure fraction of m-diisopropylbenzene boiling from about 201° C. to about 203° C. at atmospheric pressure, and thereafter treating the substantially pure m-diisopropylbenzene from the last-mentioned step in liquid phase with a free oxygen-containing gas at a temperature of from about 50° C. to about 120° C.

5. A process for the production of a diisopropylbenzene hydroperoxide-containing reaction mixture, which comprises subjecting a mixture of m- and p-diisopropylbenzene containing impurities including trimethylindan and o-diisopropylbenzene in liquid phase to alkylating conditions in contact with an alkylation catalyst and an alkylating agent having at least 1 tertiary carbon atom per molecule, the molar ratio of said alkylating agent to impurities including trimethylindan and o-diisopropylbenzene being from about 1.2–4 to 1, to alkylate said impurities including trimethylindan and o-diisopropylbenzene while the m- and p-diisopropylbenzene remain substantially unalkylated, distilling the reaction mixture to distill the substantially unalkylated m- and p-diisopropylbenzene therefrom and leave the alkylated impurities in the residue, separating the distilled m- and p-diisopropylbenzene to separately recover m- and p-diisopropylbenzene, washing the separated m-diisopropylbenzene with from about 2% to about 7% by weight of sulfuric acid based on the weight of the m-diisopropylbenzene to further remove impurities therefrom, neutralizing the thus-washed m-diisopropylbenzene with aqueous caustic solution to make possible the subsequent removal of sulfuric acid derivatives of m-diisopropylbenzene from the m-diisopropylbenzene by washing with water, then washing the neutralized m-diisopropylbenzene with water to remove sulfuric acid derivatives of m-diisopropylbenzene therefrom, drying the wet water washed m-diisopropylbenzene, fractionally distilling the dry m-diisopropylbenzene to recover a substantially pure fraction of m-diisopropylbenzene boiling at from about 201° C. to about 203° C. at atmospheric pressure, then emulsifying the last-mentioned m-diisoproylbenzene fraction in water in the pressure of a small amount of anionic surface active agent to form an oil-in-water emulsion of said m-diisopropylbenzene in water, and thereafter treating said oil-in-water emulsion of m-diisopropylbenzene in water in liquid phase with molecular oxygen at a temperature of from about 75° C. to about 100° C.

6. A process for the production of a m-diisopropylbenzene hydroperoxide-containing reaction mixture, which comprises subjecting m-diisopropylbenzene containing impurities including trimethylindan and o-diisopropylbenzene in liquid phase to alkylating conditions in contact with an alkylation catalyst and an alkylating agent having at least 1 tertiary carbon atom per molecule, the molar ratio of said alkylating agent to impurities including trimethylindan and o-diisopropylbenzene being from about 1.2–4 to 1, to alkylate said impurities including trimethylindan and o-diisopropylbenzene while said m-diisopropylbenzene remains substantially unalkylated, distilling the reaction mixture to distill the substantial unalkylated m-diisopropylbenzene therefrom and leave the alkylated impurities in the residue, washing the distilled m-diisopropylbenzene with from about 2% to about 7% by weight of sulfuric acid based on the weight of the m-diisopropylbenzene to further remove impurities therefrom, neutralizing the thus-washed m-diisopropylbenzene with caustic aqueous solution to make possible the subsequent removal of sulfuric acid derivatives of m-diisopropylbenzene from the m-diisopropylbenzene by washing with water, washing the neutralized m-diisopropylbenzene with water to remove sulfuric acid derivatives from m-diisopropylbenzene therefrom, and thereafter treating the m-diisopropylbenzene from the last-mentioned step in liquid phase with molecular oxygen at a temperature of from about 50° C. to about 120° C.

7. A process for the production of a p-diisopropylbenzene hydroperoxide-containing reaction mixture, which comprises subjecting p-diisopropylbenzene containing impurities including trimethylindan and o-diisopropylbenzene in liquid phase to alkylating conditions in contact with an alkylation catalyst and an alkylating agent having at least 1 tertiary carbon atom per molecule, the molar ratio of said alkylating agent to impurities including trimethylindan and p-diisopropylbenzene being from about 1.2–4 to 1, to alkylate said impurities including trimethylindan and o-diisopropylbenzene while said p-diisopropylbenzene remains substantially unalkylated, distilling the reaction mixture to distill the substantially unalkylated p-diisopropylbenzene therefrom and leave the alkylated impurities in the residue, and thereafter treating the p-diisopropylbenzene from the last mentioned step in liquid phase with molecular oxygen at a temperature of from about 50° C. to about 120° C.

References Cited in the file of this patent

UNITED STATES PATENTS

| | | |
|---|---|---|
| 2,633,476 | Seubold | Mar. 31, 1953 |
| 2,648,713 | Schneider | Aug. 11, 1953 |

FOREIGN PATENTS

| | | |
|---|---|---|
| 968,209 | France | Apr. 12, 1950 |
| 485,435 | Canada | Aug. 5, 1952 |

OTHER REFERENCES

Nightingale et al.: Jour. Amer. Chem. Soc., vol. 66, pp. 154–5 (2 pages; January 1944).

Kutz et al.: Jour. Amer. Chem. Soc., vol. 70, pp. 4026–8 (3 pages; December 1948).